F. W. GOWER, H. J. OWEN AND E. COX
INSULATED HANDLE FOR ALUMINIUM SAUCEPANS.
APPLICATION FILED APR. 15, 1919.
1,328,510.
Patented Jan. 20, 1920.
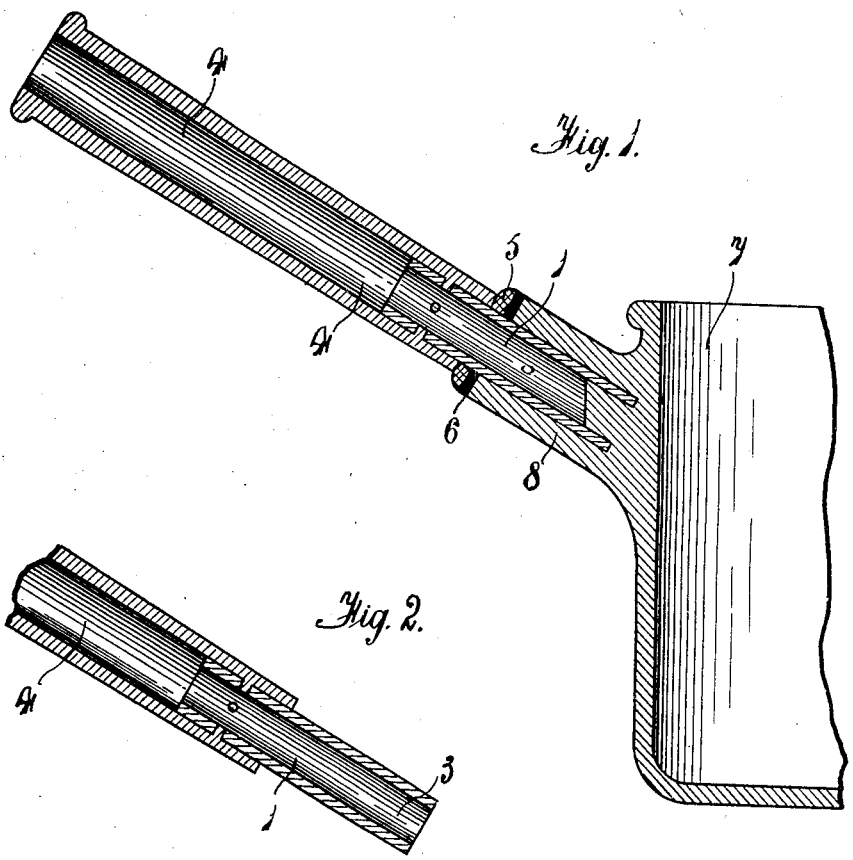

UNITED STATES PATENT OFFICE.

FRANCIS WILLIAM GOWER, HUGH JAMES OWEN, AND ERNEST COX, OF BIRMINGHAM, ENGLAND.

INSULATED HANDLE FOR ALUMINIUM SAUCEPANS.

1,328,510.

Specification of Letters Patent.

Patented Jan. 20, 1920.

Application filed April 15, 1919. Serial No. 290,313.

*To all whom it may concern:*

Be it known that we, FRANCIS WILLIAM GOWER, HUGH JAMES OWEN, and ERNEST COX, subjects of the King of Great Britain, residing at Birmingham, England, have invented certain new and useful Improvements in Insulated Handles for Aluminium Saucepans, of which the following is a specification, reference being had therein to the accompanying drawing.

This invention relates to aluminium cooking utensils such as saucepans, stewpans, and the like, and has for its object the production of a cast pan and insulated handle in one which will dispense with all fitting such as riveting the handle and leave no attachment behind in which dirt can lodge. Also the handle being cast in one piece with the pan, the resulting article is far stronger and more durable in use.

In making the handle portion, a piece of steel or other metal tubing is placed in a suitable die and so that the tubing projects therefrom. Aluminium in a state of flux is then poured into the die and contracts when cold onto the tubing, holes in the tubing also acting as keys to the aluminium. A brass or other metal ring is now slid onto the tubing together with an asbestos packing ring and the whole inserted into a further die in which the body of the pan is cast, the handle being cast into a boss of the pan. The handle and pan are thus cast in one with the brass and asbestos rings dividing the aluminium in the handle and acting as an effective insulation to the heat from the pan.

In the accompanying sheet of drawings Figure 1 is a part view of a saucepan according to our invention, showing the handle portion in section, Fig. 2 is a sectional view of part of the handle with steel tubing and Fig. 3 is a perspective view of the steel tubing only.

The steel tubing 1 having holes 2 cut therein is placed in a suitable die so that its end 3 projects therefrom. Aluminium is then run into the die and around the steel tubing to constitute the handle 4, the metal running into the holes 2 in the tubing to constitute a key. A brass or other metal ring 5 is now slid onto the metal tubing together with an asbestos packing ring 6 to act as an insulating material and the tubing is then inserted into a further die in which the body of the pan 7 is cast, the boss or shoulder 8 of the pan being cast onto the said tubing. The pan and its handle with insulating medium are thus cast in one resulting in a strong article which cannot be dismembered.

What we claim as our invention and desire to secure by Letters Patent is:—

1. A culinary vessel comprising a cast body part, with an integral tubular boss, a tubular handle with an outer free end, a tubular connecting piece upon opposite ends of which the boss and the handle are cast and a metallic washer interposed between the inner end of the handle part and the boss, the handle and connecting piece being formed with interlocking means by which an unobstructed air space is provided in the handle and connecting piece.

2. In a culinary vessel, the combination of a body part having an integrally cast boss, a cast metal handle, a connecting piece, an insulating washer and a metallic washer arranged on the connecting piece, the boss of the body part and the handle being in casting engagement with the opposite ends of the connecting piece and in contact, respectively with said insulating washer and said metallic washer.

3. In a culinary vessel, the combination of a body part and a handle with a metal tubing piece connecting the body part and handle, said tubing having radial holes near its outer end, the body part of the vessel having a boss cast upon and partly into the inner end of said tubing, and the handle being cast on the outer end of said tubing, part of the metal of the handle entering said radial holes.

In testimony whereof we have affixed our signatures in presence of two witnesses.

FRANCIS WILLIAM GOWER.
HUGH JAMES OWEN.
ERNEST COX.

Witnesses:
FRANK BIDDLE,
EMMIE HILDA CHATWIN.